(12) United States Patent
Hann

(10) Patent No.: US 7,324,501 B1
(45) Date of Patent: Jan. 29, 2008

(54) METHOD AND SYSTEM FOR MULTICASTING OVER A UTOPIA BUS

(75) Inventor: William P. Hann, Round Rock, TX (US)

(73) Assignee: Cisco Technology, Inc., San Jose, CA (US)

( * ) Notice: Subject to any disclaimer, the term of this patent is extended or adjusted under 35 U.S.C. 154(b) by 1314 days.

(21) Appl. No.: 10/035,605

(22) Filed: Dec. 28, 2001

(51) Int. Cl.
*H04L 12/66* (2006.01)

(52) U.S. Cl. ............... 370/352; 370/449; 370/468; 370/493

(58) Field of Classification Search ............ None
See application file for complete search history.

(56) References Cited

U.S. PATENT DOCUMENTS

| | | | |
|---|---|---|---|
| 5,548,587 A | 8/1996 | Bailey et al. ............... | 370/60.1 |
| 5,781,320 A | 7/1998 | Byers ........................ | 359/123 |
| 6,188,669 B1 * | 2/2001 | Bellenger ................... | 370/230 |
| 6,243,382 B1 | 6/2001 | O'Neill et al. ............. | 370/395 |
| 6,269,154 B1 * | 7/2001 | Chellali et al. ........... | 379/93.28 |
| 6,614,781 B1 * | 9/2003 | Elliott et al. ............. | 370/352 |
| 6,683,887 B1 * | 1/2004 | Huang et al. .............. | 370/466 |
| 6,795,396 B1 | 9/2004 | Parchak et al. ........... | 370/230 |
| 6,862,294 B1 * | 3/2005 | Hann et al. ................ | 370/449 |
| 6,965,603 B1 | 11/2005 | Parruck et al. ........... | 370/395 |
| 6,975,629 B2 * | 12/2005 | Welin ........................ | 370/392 |
| 2002/0021661 A1 | 2/2002 | DeGrandpre et al. ....... | 370/219 |
| 2002/0097739 A1 * | 7/2002 | Chen et al. ............... | 370/432 |
| 2003/0198178 A1 | 10/2003 | Joo ........................... | 370/208 |
| 2005/0030950 A1 | 2/2005 | Jackson .................... | 370/395 |

* cited by examiner

*Primary Examiner*—Phirin Sam
(74) *Attorney, Agent, or Firm*—Baker Botts L.L.P.

(57) ABSTRACT

According to one embodiment of the invention, a method for multicasting data includes receiving, at a line card multicast data and an indication of a plurality of destinations for the multicast data. The method also includes transferring the multicast data over a common bus to a plurality of digital subscriber line chipsets associated with the plurality of destinations. Such transfer occurs by selecting two or more of the plurality of digital subscriber line chipsets to receive multicast data, enabling the two or more selected digital subscriber line chipsets to receive the multicast data, and transferring the multicast data over the common bus to the selected digital subscriber line chipsets after selection and enabling of the two or more of the plurality of digital subscriber line chipsets.

27 Claims, 4 Drawing Sheets

METHOD AND SYSTEM FOR MULTICASTING OVER A UTOPIA BUS

TECHNICAL FIELD OF THE INVENTION

This invention relates generally to telecommunications and more particularly to a method and system for multicasting over a UTOPIA bus.

BACKGROUND OF THE INVENTION

Data communications is becoming increasing important in today's society. Many media exist for transmitting data, including the airways, cable, and telephone lines. As technology develops, these types of media may be used in new ways. For example, video data, such as television, has traditionally been transmitted over either cable or the airways. However, technology enhancements may allow such transmissions to occur in a viable fashion over telephone lines. One problem associated with transmitting video or other types of data over telephone lines is addressing how to transmit data to multiple locations, referred to herein as multicasting.

One format for communicating data is asynchronous transfer mode (ATM) format. Many other formats exist. According to one technique, an ATM switch addresses multicasting by identifying a data cell as a multicast cell and then making multiples copies of the cell. The multiple copies are stored in memory and transmitted separately at an appropriate time to each destination. A problem with this approach is that transmitting multiple copies of data is time-consuming and contributes to switch latency.

SUMMARY OF THE INVENTION

According to one embodiment of the invention, a method for multicasting data includes receiving, at a line card multicast data and an indication of a plurality of destinations for the multicast data. The method also includes transferring the multicast data over a common bus to a plurality of digital subscriber line chipsets associated with the plurality of destinations. Such transfer occurs by selecting two or more of the plurality of digital subscriber line chipsets to receive multicast data, enabling the two or more selected digital subscriber line chipsets to receive the multicast data, and transferring the multicast data over the common bus to the selected digital subscriber line chipsets after selection and enabling of the two or more of the plurality of digital subscriber line chipsets.

According to another embodiment of the invention, an apparatus comprises a buffer, a plurality of UTOPIA physical devices each coupled to a common bus, and a plurality of polling units. Each polling unit is operable to poll at least a respective one of the UTOPIA physical devices to determine if at least one respective UTOPIA physical device is ready to receive data. The apparatus also includes a select unit. The select unit is operable to receive an indication from each of the plurality of polling units that a respective UTOPIA physical device is ready to receive data. The select unit is also operable to initiate enabling of selected ones of the physical devices that are ready to receive data and for which any data stored in the buffer is intended such that more than one of the UTOPIA physical devices are able to receive data at the same time. The select unit is further operable to initiate transfer of data stored in the buffer over a common bus to enable the UTOPIA physical device. The apparatus also includes a transfer unit operable to transmit the data stored in the buffer simultaneously to the enabled UTOPIA physical devices.

Some embodiments of the invention provide numerous technical advantages. Other embodiments may realize some, none, or all of these advantages. For example, according to one embodiment, a plurality of physical devices may receive data at the same time through one transfer of data. This contrasts with previous systems in which multicast data must be transmitted multiple times for each recipient. By allowing multiple recipients to receive the same transfer data, the bandwidth of an associated line card may be increased. Increasing the bandwidth allows the line card to accommodate more data requests and more customers.

Other technical advantages may be readily ascertainable by one of skill in the art.

BRIEF DESCRIPTION OF THE DRAWINGS

Reference is now made to the following description taken in conjunction with the accompanying drawings, wherein like reference numbers represent like parts, in which.

DETAILED DESCRIPTION OF THE INVENTION

Embodiments of the invention are best understood by referring to FIGS. 1 through 6 of the drawings, like numerals being used for like and corresponding parts of the various drawings.

Figure 1A:
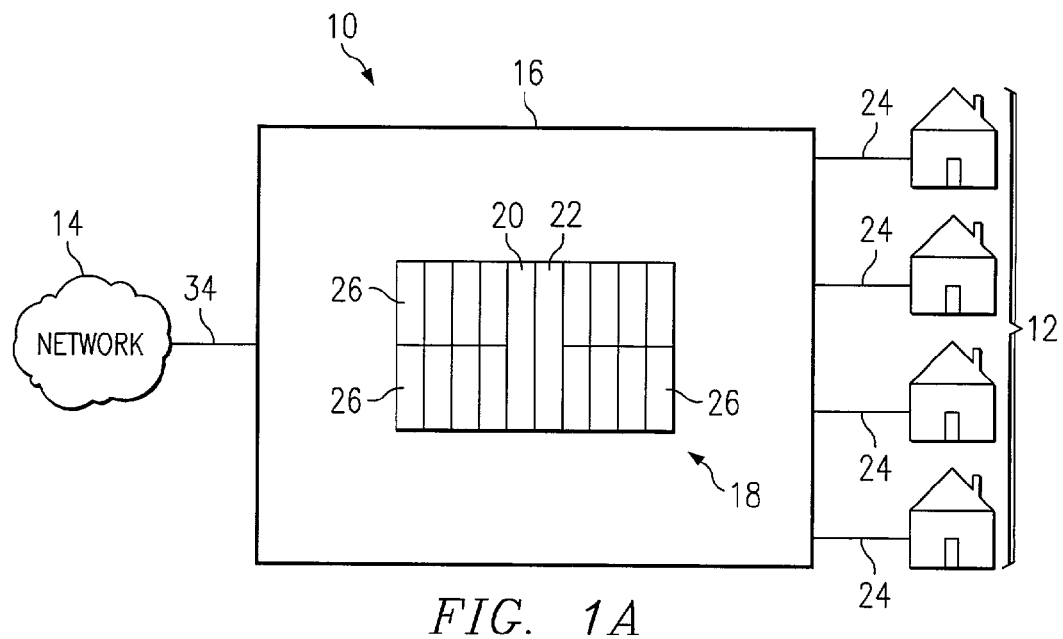
FIG. 1A is a schematic diagram of a telecommunications system according to the teachings of the invention.

FIG. 1A is a block diagram of a telecommunications system 10 according to the teachings of the inventions. Telecommunications system 10 includes a plurality of homes or businesses (or other locations) 12 (referred to herein as "customer premises 12") and a network 14, such as an Internet protocol network. A central office 16 receives a plurality of telephone lines 24 coupled to respective ones of customer premises 12. Network 14 couples to central office 16 through a trunk line 34. Trunk line 34 may be any suitable communication link that may carry Internet protocol traffic, including OC3, DS3, T1 (STM1, E3, E1, in. Europe).

Central office 16 comprises, among other components not explicitly shown, a digital subscriber line access multiplex or DSLAM 18. DSLAM 18 comprises, in this example, a first network interface card 20, a second network interface card 22, and a plurality of line cards 26. DSLAM 18 generally allows communication between customer premises 12 and network 14. Network interface card 20 communicates with network 14 over line 34 (connection not explicitly shown in FIG. 1). Network interface card 20 receives data from network 14 over line 34 and communicates it to a particular line card 26 associated with the intended destination of the data. Conversely, network interface card 20 receives data form line cards 26 and communicates it over line 34 to network 14. Network interface card 20 also contains the IP/ATM switch fabric that manages and processes packets and cells. It manages all aspects of the DSLAM 18, including system help, system performance, switch help and performance, and network communications. Network interface card 22 may serve as a backup for network interface card 20. In some embodiments, network interface card 22 is omitted.

Line cards 26 receive communications over telephone lines 24 (connection not explicitly shown in FIG. 1A) from a customer premises 12 and communicate that information to network interface card 20 for eventual transmission to network 14. Conversely, line cards 26 receive communications through network interface card 20 from network 14 and communicate it to a particular one of customer premises 12 over line 24. Line cards 26 are described in greater detail below in conjunction with FIG. 1B.

Figure 1B:
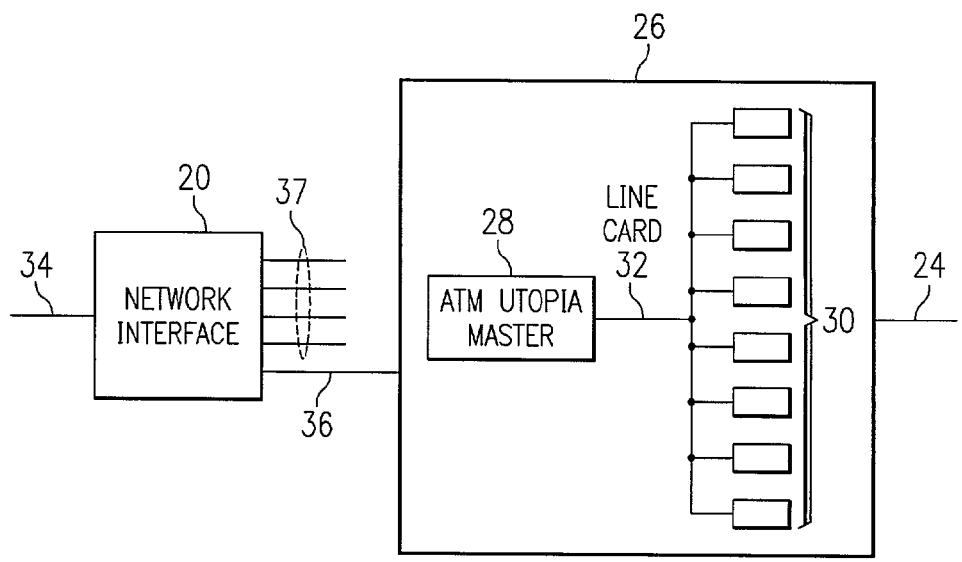
FIG. 1B is a block diagram showing additional details of the line card of FIG. 1A.

FIG. 1B is a block diagram showing portions of line card 26 and network interface card 20 of FIG. 1A. As illustrated, line card 26 is coupled to network interface card 20 by a communication link 36. Communication link 36 may be a UTOPIA bus connected across a backplane of DSLAM 18, in one embodiment; however, communication link 36 may take other forms. Line card 26 includes an ATM UTOPIA master controller 28 coupled to a plurality of DSL chipsets, or modems 30, by a UTOPIA bus 32. DSL chipsets 30 provide received data to an associated customer premises 12 over telephone line 24. Network interface 20 couples to network 14 through trunk line 34. A plurality of buses 37 such as high speed serial buses may couple the other line cards 26 to network interface card 20 (not explicitly shown in FIG. 1B). ATM UTOPIA master controller 28 controls transfer of data received from network interface card 20 over line 36 through the various DSL chipsets 30. Data may be transferred from ATM UTOPIA master controller 28 to DSL chipsets 30 over a data bus 56 (shown in FIG. 2). Additional details of ATM UTOPIA master controller 28 are described with respect to FIG. 2 below. ATM UTOPIA master controller 28 may be implemented as a field programmable gate array (FPGA), as an application specific integrated circuit (ASIC), or may be implemented in other suitable forms. DSL chipsets 30 are UTOPIA physical devices, sometimes referred to as PHY's. Each DSL chipset 30 operates as a slave of ATM UTOPIA master controller through UTOPIA bus 32.

Conventionally, an ATM UTOPIA master controller addresses multicast data as follows. A polling engine within the master controller polls a physical device, such as DSL chipset 30, by placing the physical device's address on bus 32. When the DSL chipset 30 sees its own address on UTOPIA bus 32, it places a cell available signal on the bus for receipt by the polling engine. In response, the polling engine places the same address again on UTOPIA bus 32, indicating that the addressed DSL chipset is selected to receive data. In response to selecting a particular DSL chipset to receive data, data that has been received from network interface card 20 is transferred to the selected device over a data bus. This procedure is repeated for each recipient of the multicast data. Thus, if four customer premises associated with respective ones of DSL chipsets 30 each wish to receive the multicast data, four separate polling, selection, and transfer of data steps are applied.

According to the teachings of the invention, rather than polling each of DSL chipsets 30 with a single polling controller, and thus requiring a separate transfer of data for each recipient, either a separate polling engine is provided for each DSL chipset, or a separate polling engine is provided for a group of DSL chipsets 30. By allowing separate polling of various DSL chipsets, multicast data may be transferred to more than one DSL chipset at any given time, reducing the number of transfers that need to take place to distribute multicast data to all intended recipients. By being able to transfer multicast data to more than one DSL chipset at the same time, the bandwidth available from line card 26 is increased. Details of one embodiment of the invention are described in greater detail with respect to FIGS. 2 through 5, and details of an alternative embodiment are described with respect to FIG. 6.

Figure 2:
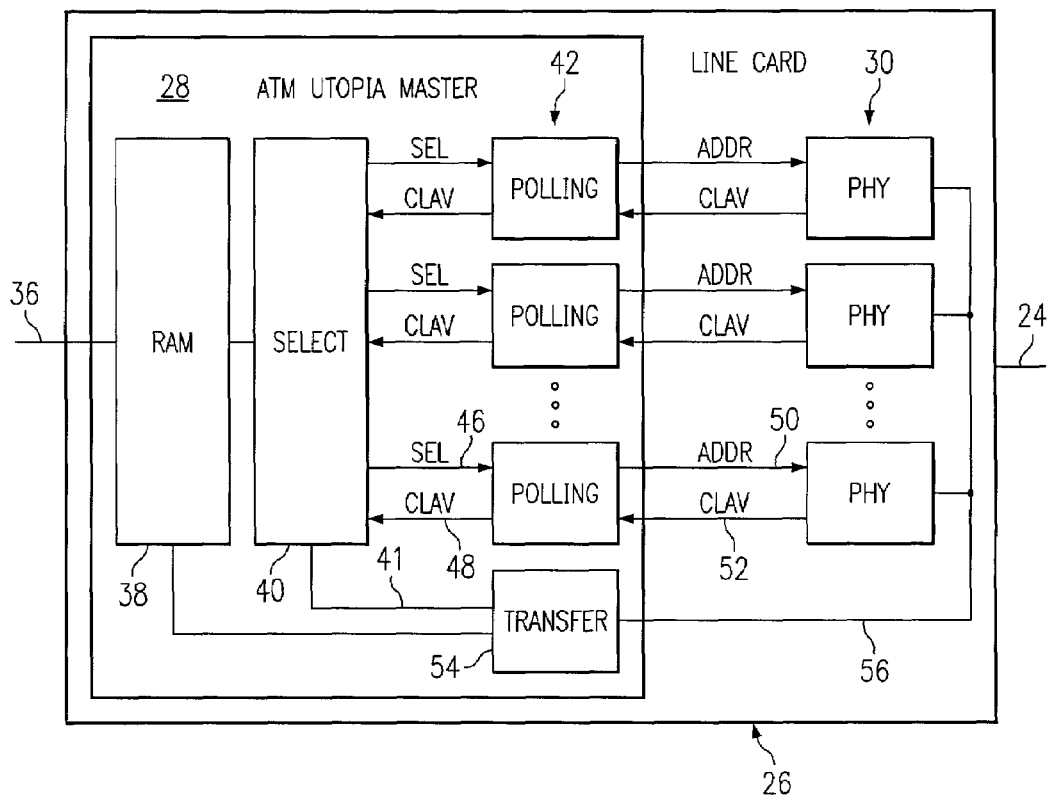
FIG. 2 is a block diagram showing additional details of the ATM UTOPIA master controller of FIG. 1B.

FIG. 2 is a block diagram showing additional details one embodiment of line card 26 according to the teachings of the invention. Line card 26 includes a random access memory (RAM) 38, a select unit 40, a plurality of polling units 42, a transfer unit 54, and a plurality of DSL chipsets 30, in this embodiment. Random access memory 38 comprises any suitable form of memory for storing data for receipt by DSL chipsets 30. Select unit 40 controls selection of which ones of DSL chipsets 30 to select to receive data, as described in greater detail below in conjunction with FIG. 3. Polling units 42 poll, in this example, an associated one of DSL chipsets 30 to determine if the DSL chipset is ready to receive data. According to the teachings of the invention, a separate polling unit is provided for each DSL chipset 30, in this embodiment.

Transfer unit 54 receives instructions from select unit 40 over line 41 instructing transfer unit to transfer data stored in random access memory 38 onto a data bus 56. Data bus 56 may be any suitable link for providing data to one or more UTOPIA devices, such as DSL chipsets 30. In this example, data bus 56 is a 16 bit data bus with a start of cell (SOC); however, other sizes of data buses may be used. Each polling unit 42 is coupled to select unit 40 by a select line 46 and a cell available line 48. Each polling unit 42 is also coupled to a DSL chipset 30 by an address line 50 and a cell available line 52. In this example, lines 46, 48 and 52 are all one bit lines; however, other suitable sizes of lines may be used. Address line 50 may be any suitable size; however, for UTOPIA 2 communications, a five-bit address line is used in one embodiment. For UTOPIA 3 communication, lines 50 having greater than five bits of bandwidth are particularly advantageous.

In operation, each polling unit 42 places the address of its associated DSL chipset 30 on its associated address line 50. The polling unit 42 then idles when it receives a cell available signal from the DSL chipset 30 over line 52. The receipt of the cell available signal over line 52 indicates that the associated DSL chipset 30 is ready to receive data. In response to polling unit 42 receiving a cell available signal over line 52, polling unit 42 transmits a cell available signal over line 48 to select unit 40 identifying the associated physical device that is ready prepared to receive data.

Select unit 40 examines data received in random access memory 38 to determine its destination. In one example, the data stored in random access memory comprises a cell of data having an associated field identifying the destination address or addresses. In response to receiving cell available signals from polling units 42 identifying DSL chipsets 30 that are ready to receive data and select unit identifying these DSL chipsets 30 as ones for which the multicast data are intended, select unit 40 selects those DSL chipsets and directs transfer unit 54, over line 41, to initiate transfer of the data out of random access memory 38 onto data bus 56. Such initiation of transfer may occur immediately upon identifying a particular one of DSL chipset 30 that is prepared to receive data, or may take place after identification of a plurality of such DSL chipsets 30. In one embodiment, all DSL chipsets 30 for which data are intended are enabled before data are transferred. In another embodiment, only some DSL chipsets 30 are enabled at the same time and multiple transmissions of the same data are required.

Select unit 40 selects a DSL chipset to receive data by directing the associated polling unit, over line 46, to select the DSL chipset. The polling unit 42 selects the DSL chipset by again placing the address of the physical device on address line 50. According to UTOPIA protocol, upon again receiving its address on address line 50, the DSL chipset 30 enables itself to read data on data bus 56. This selection procedure may take place for each DSL chipset 30 identified as an intended address for the data in random access memory 38. Thus, for multicast data, a plurality of DSL chipsets 30 may be selected to receive data residing on data bus 56 at substantially the same time. In contrast, in conventional systems utilizing only one polling unit, only one DSL chipset could be selected at a time. This means that multicast data must be re-transferred from random access memory 38 to the DSL chipsets for each intended address, which causes undue delay.

With respect to multicast data, line card 30 provides greater bandwidth than some other line cards that do not utilize more than one polling unit. The provision of more than one polling unit 42 allows multiple DSL chipsets 30 to receive data transmitted over data bus 56 at substantially the same time. Polling unit 42 and DSL chipset 30 may be formed according to conventional techniques and may be the same type of polling unit and physical device utilized in line cards having only one polling unit.

Thus, a system and method are provided that allow multicasting of data in a reduced number of data transfer procedures, rather than transmitting the same data once for each and every destination. Such a method increases bandwidth on data bus 56, in one example, and reduces the overall bandwidth required for multicasting. Additional details regarding select unit 40, polling units 42, and transfer unit 54 are described with respect to FIGS. 3 through 5.

Figure 3:
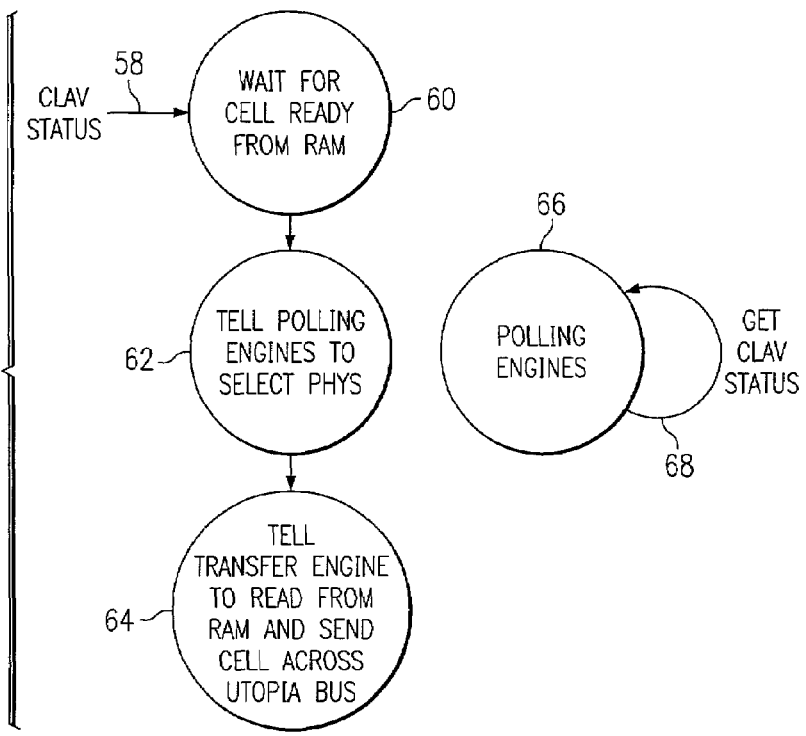
FIG. 3 is a state diagram of the select unit of FIG. 2.

FIG. 3 is a state diagram of select unit 40. At step 60, select unit 40 waits until data are ready to be transferred from random access memory 38. In this example, data are stored in cells; however, any suitable grouping of data may be used. In addition, select unit 40 waits until a cell available status signal is received over one of cell available lines 48, as indicated by reference numeral 58. Such a cell available signal is received from a polling unit 42, which continually monitors its associated DSL chipset for a cell available signal received over line 52. This monitoring is performed at step 66. If a cell is ready for transfer from random access memory 38 and a cell available signal is received by select unit 40, select unit 40 directs the associated polling engines from which cell available signals were received to select the associated DSL chipset 30 to receive data. Polling units 42 may select the DSL chipset 30 by outputting, on its associated address line 50, the address of the DSL chipset 30. At step 64, select unit 40 instructs transfer unit 54 to read the data from random access memory 38 and send it across UTOPIA bus 56 for receipt by the appropriate physical devices 30. Step 64 may occur at any suitable time, such as a time after which a certain number or percentage of the DSL chipsets intended to receive multicast data are selected.

Figure 4:
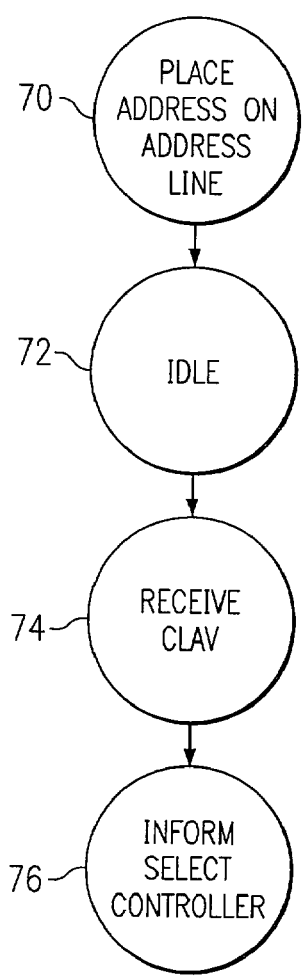
FIG. 4 is a state diagram of the polling unit of FIG. 2.

FIG. 4 is a state diagram of polling units 42. At step 70, polling unit 42 places the address of its associated physical device on address line 50. At step 72, polling unit 42 idles and continues to poll until it receives a cell available signal from its associated physical device at step 74. In response to receiving a cell available signal at step 76, polling unit 42 informs select controller 40 that its associated physical device 30 is available to receive data by providing a cell available signal over line 48. As described above, after instructed to do so by select unit 40, polling unit 42 also places the address of the associated DSL chipset 30 on the address line 50 again to select the DSL chipset 30 to receive data.

Figure 5:
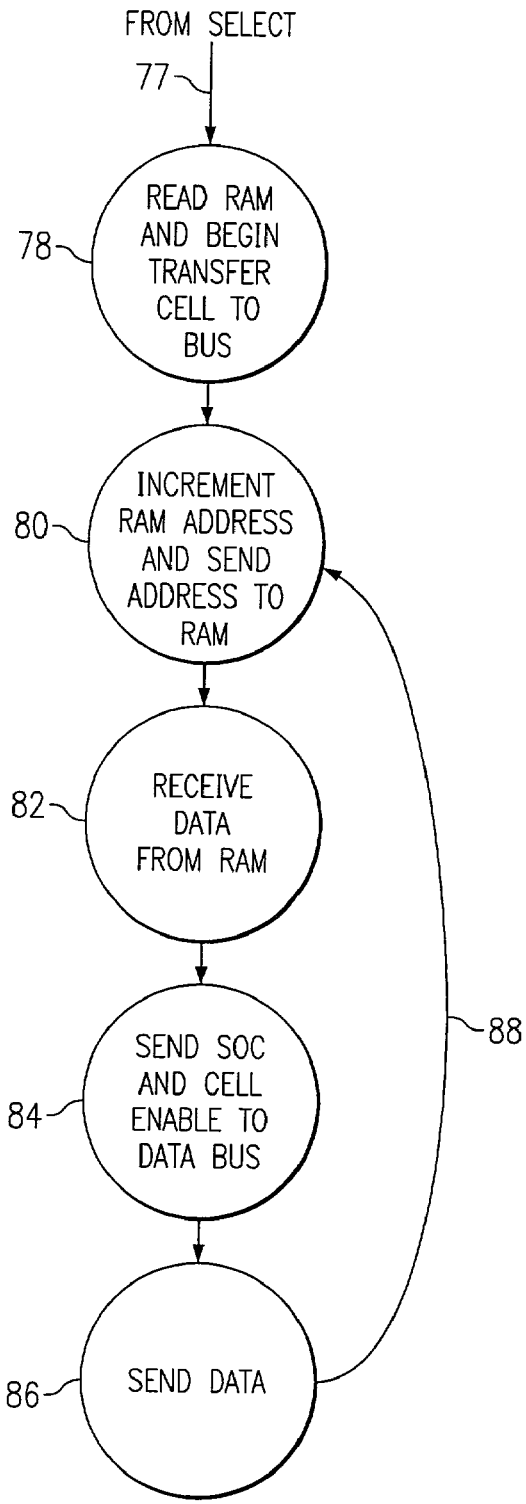
FIG. 5 is a state diagram of the transfer unit of FIG. 2.

FIG. 5 is a state diagram of transfer unit 54. At step 78, transfer unit accesses random access memory 38 and begins the transfer process of transferring data stored within the memory to bus 56. This process is initiated by a signal received from select unit 40 over line 41, as denoted by reference numeral 77. At step 80, the RAM address identifying the location of data to be transferred is incremented and provided to random access memory 38. At step 82, data are received by transfer units 54 from random access memory 38. At step 84, transfer unit 54 places a start of cell (SOC) signal and a cell enable signal on data bus 56 to identify for the selected DSL chipsets 30 that data are about to be transferred to them. At step 86, transfer unit 54 transmits the data read from random access memory 38 onto data bus 56. Processing continues at step 80 until all data designed for the selected DSL chipsets 30 have been transmitted to data bus 56, except that at step 84 sending a start of cell (SOC) signal occurs only once before any data are transferred and is not repeated.

Figure 6:
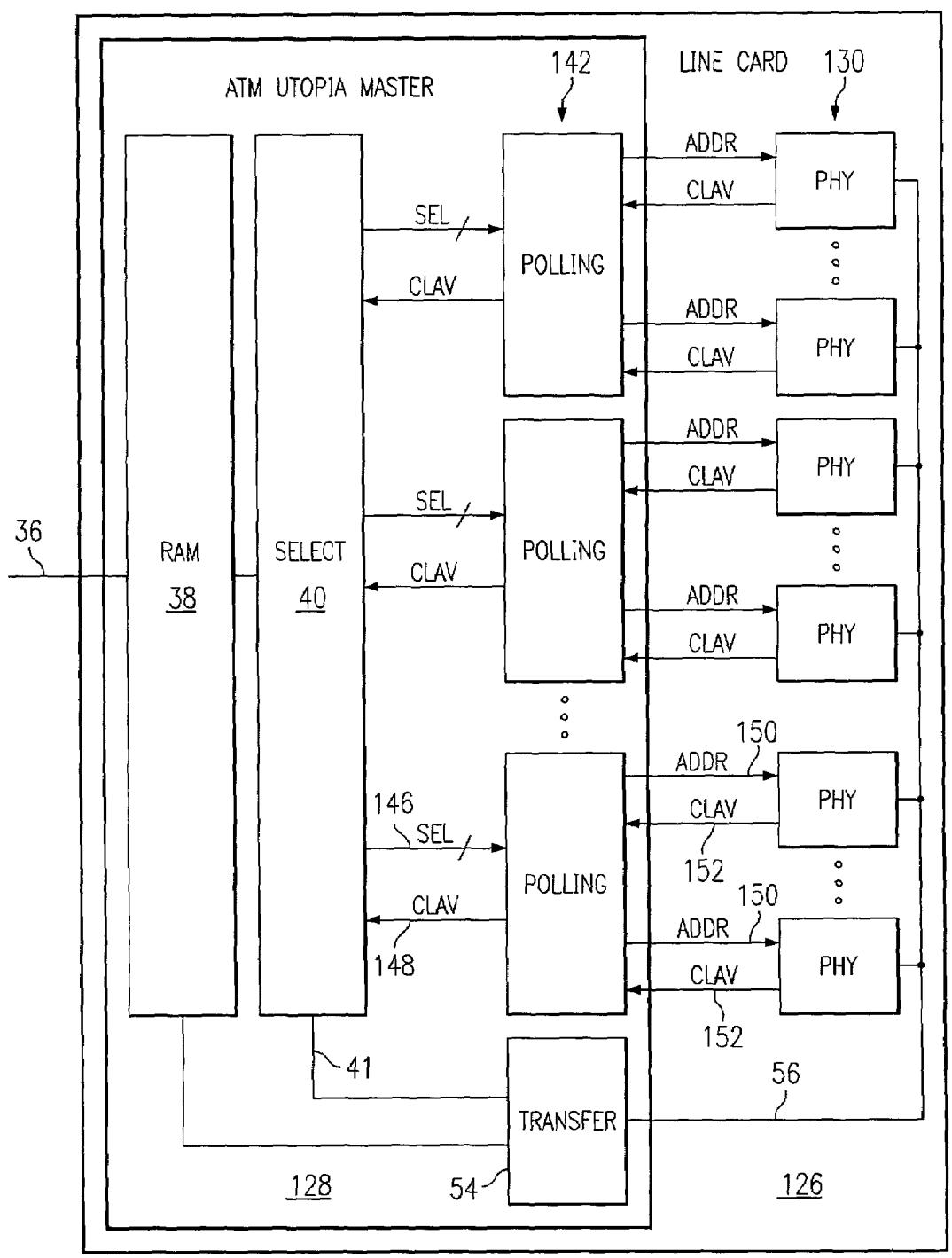
FIG. 6 is a block diagram of an alternative embodiment of the UTOPIA master controller of FIG. 2.

FIG. 6 is a block diagram of an alternative embodiment of a line card 126 according to the teachings of the invention. Line card 126 is substantially similar to line card 26 except that there is not necessarily a one-to-one correspondence between polling units 142 and associated physical devices 130. In this example, each polling unit within a single line card 126 is associated with a plurality of physical devices 130 although there may be a one-to-one correspondence for some of the polling units 142. Select line 146 may comprise a multi-bit line that allows select unit 40 to transmit the address of the associated physical device rather than just a one-bit signal indicating that the associated device has been selected. Operation of line card 126 is substantially similar to that of line card 26 except that polling units 142 poll all of their associated DSL chipsets 130 until told by select engine 40 to select a particular one. Once a particular DSL chipset is selected to receive data, polling unit 142 continues to poll all other unselected DSL chipsets 130 until transfer of data actually occurs. Transfer of data may occur as described above with respect to FIGS. 2 through 5.

Although the present invention has been described with several example embodiments, various changes in modifications may be suggested to one skilled in the art. It is intended that the present invention encompass those changes and modifications as they fall within the scope of the claims.

What is claimed is:

1. A method for multicasting data to a plurality of UTOPIA devices comprising:

providing a plurality of UTOPIA physical devices connected to a common data bus, each UTOPIA physical device operable to communicate according to UTOPIA protocol, wherein each UTOPIA physical device is coupled to a respective one of a plurality of polling units, each polling unit coupled to a select controller, the select controller operable to initiate selection of two or more of the plurality of UTOPIA physical devices to receive multicast data;

for at least two of the polling units, receiving at the select controller an indication that the respective UTOPIA physical device is ready to receive data;

selecting for receipt of multicast data two or more of the UTOPIA devices that are ready to receive data by:

for each UTOPIA physical device to be selected transmitting, from the select controller, to the polling unit coupled to the UTOPIA physical device to be selected, an indication that the UTOPIA physical device to be selected should be selected; and for each polling unit receiving an indication that the UTOPIA physical device to be selected should be selected, transmitting an address of the UTOPIA physical device coupled to the polling unit from the polling unit to the UTOPIA physical device coupled to the polling unit; and after selection of the two or more of the UTOPIA devices, initiating, by the select controller, transfer of the multicast data through the common bus to the selected UTOPIA physical devices.

2. The method of claim 1, and further comprising receiving, for the at least two of the polling units, from the respective UTOPIA physical device, an indication that the respective UTOPIA physical device is ready to receive data.

3. The method of claim 1, and further comprising polling, for the at least two of the polling units, the respective UTOPIA physical device, to determine if the respective UTOPIA physical device is ready to receive data.

4. The method of claim 3, wherein polling the respective UTOPIA physical device comprises transmitting an address of the respective UTOPIA physical device to the respective UTOPIA physical device.

5. The method of claim 1, wherein providing a plurality of UTOPIA physical devices comprises providing a plurality of digital subscriber line chipsets.

6. The method of claim 1, wherein the plurality of polling units comprises at least eight polling units and wherein receiving, for at least two of the polling units, at the select controller an indication that the respective UTOPIA physical device is ready to receive data comprises receiving, for at least eight of the polling units, an indication that the respective UTOPIA physical device is ready to receive data.

7. The method of claim 1, and further comprising transferring the multicast data through the common bus to the selected UTOPIA physical devices.

8. The method of claim 1, and further comprising receiving at the select controller an indication of the UTOPIA physical devices for which the multicast data are intended.

9. A method for multicasting data comprising:

receiving at a line card multicast data and an indication of a plurality of destinations for the multicast data;

transferring the multicast data over a common bus to a plurality of digital subscriber line chipsets associated with the plurality of destinations by:

selecting two or more of the plurality of digital subscriber line chipsets to receive multicast data that are ready to receive data wherein the line card comprises one polling unit for each of the plurality of digital subscriber line chipsets, each polling unit to determine if the associated digital subscriber line chipset is ready to receive data;

enabling the two or more selected digital subscriber line chipsets to receive the multicast data; and transferring the multicast data over the common bus to the selected digital subscriber line chipsets after selection and enabling of the two or more of the plurality of digital subscriber line chipsets.

10. The method of claim 9, wherein transferring the multicast data over the common bus to the selected digital subscriber line chipsets after selection and enabling of the two or more of the digital subscriber line chipsets comprises transferring the multicast data over the common bus substantially simultaneously to the selected and enabled digital subscriber line chipsets.

11. The method of claim 9, wherein transferring the multicast data over a common bus to a plurality of digital subscriber line chipsets after selection and enabling of the two or more of the plurality of digital subscriber line chipsets comprises transferring the multicast data over a common bus to a plurality of digital subscriber line chipsets located on the line card.

12. The method of claim 9, wherein the line card comprises at least two polling units, each polling unit coupled to one or more of the digital subscriber line chipsets and operable to determine if any of the one or more digital subscriber line chipsets is ready to receive data.

13. The method of claim 9, and further comprising receiving at a select controller on the line card an indication that the two or more of the plurality of digital subscriber line chipsets are ready to receive data.

14. The method of claim 9, and further comprising, for each polling unit associated with the two or more of the plurality of digital subscriber line chipsets, transmitting an indication to a select controller on the line card that the digital subscriber line chipset is ready to receive data.

15. A apparatus comprising:

a buffer;

a plurality of UTOPIA physical devices each coupled to a common data bus;

a plurality of polling units each operable to poll at least a respective one of the UTOPIA physical devices to determine if the at least one respective UTOPIA physical device is ready to receive data;

a select unit to:

receive an indication from each of the plurality of polling units that a respective UTOPIA physical device is ready to receive data;

initiate enabling of selected ones of the UTOPIA physical devices that are ready to receive data and for which any data stored in the buffer is intended such that more than one of the UTOPIA physical devices are enabled to receive data at the same time; and initiate transfer of data stored in the buffer over the common bus to the enabled UTOPIA physical devices; and a transfer unit operable to transmit the data stored in the buffer substantially simultaneously to the enabled UTOPIA physical devices.

16. The apparatus of claim 15, and further comprising, for at least one of the polling units, a plurality of respective address lines and cell available lines coupling the polling unit to more than one of the plurality of UTOPIA physical devices.

17. The apparatus of claim 15, and further comprising, for each polling unit, an address line and a cell available line coupling the polling unit to exactly one of the UTOPIA physical devices.

18. The apparatus of claim 15, and further comprising, for each polling unit, a select line and a cell available line coupling the polling unit to the select unit.

19. The apparatus of claim 15, and further comprising a transfer unit operable to transfer data from the buffer to the common bus for receipt by the plurality of UTOPIA physical devices.

20. The apparatus of claim 18, wherein the select line comprises a multi-bit select line.

21. The apparatus of claim 15, wherein the select unit is further operable to initiate enablement of all of the plurality of UTOPIA physical devices that are ready to receive data and for which any data stored in the buffer is intended.

22. The apparatus of claim 15, wherein the buffer, the plurality of UTOPIA physical devices, the plurality of polling units, the select unit, and the transfer unit are formed on a line card.

23. A line card comprising:
a buffer;
a plurality of digital subscriber line chipsets each coupled to a common data bus;
a plurality of polling units each operable to poll at least a respective one of the UTOPIA physical devices to determine if the at least one respective UTOPIA physical device is ready to receive data, each polling unit coupled to at least one of the plurality of UTOPIA physical devices by an address line and a cell available line;
a select unit coupled to each of the plurality of polling units by respective select lines and cell available lines, the select unit to:
  receive an indication from each of the plurality of polling units that a respective UTOPIA physical device is ready to receive data;
  initiate enabling of selected ones of the UTOPIA physical devices that are ready to receive data and for which any data stored in the buffer is intended such that more than one of the UTOPIA physical devices are enabled to receive data at the same time; and
  initiate transfer of data stored in the buffer over the common bus to the enabled UTOPIA physical devices; and
a transfer unit operable to transmit the data stored in the buffer substantially simultaneously to the enabled UTOPIA physical devices.

24. A line card comprising:
a buffer;
a plurality of digital subscriber line chipsets each coupled to a common data bus;
a plurality of polling units each operable to poll at least a respective one of the UTOPIA physical devices to determine if the at least one respective UTOPIA physical device is ready to receive data, each polling unit coupled a plurality of UTOPIA physical devices by respective address lines and a cell available lines;
a select unit coupled to each of the plurality of polling units by respective select lines and cell available lines, the select unit to:
  receive an indication from each of the plurality of polling units that a respective UTOPIA physical device is ready to receive data;
  initiate enabling of selected ones of the UTOPIA physical devices that are ready to receive data and for which any data stored in the buffer is intended such that more than one of the UTOPIA physical devices are enabled to receive data at the same time; and
  initiate transfer of data stored in the buffer over the common bus to the enabled UTOPIA physical devices; and
a transfer unit operable to transmit the data stored in the buffer substantially simultaneously to the enabled UTOPIA physical devices.

25. The line card of claim 24, wherein the select lines coupling the plurality of polling units to the select unit comprise multiple lines.

26. The line card of claim 24, wherein the select lines coupling the plurality of polling units to the select unit comprise a multi-bit line.

27. A apparatus comprising:
a storage means for temporarily storing data;
a plurality of UTOPIA physical devices each coupled to a common data bus;
a plurality of polling means for polling at least a respective one of the UTOPIA physical devices to determine if the at least one respective UTOPIA physical device is ready to receive data;
a select means for:
  receiving an indication from each of the plurality of polling means that a respective UTOPIA physical device is ready to receive data;
  initiating enabling of selected ones of the UTOPIA physical devices that are ready to receive data and for which any data stored in the storage means is intended such that more than one of the UTOPIA physical devices are enabled to receive data at the same time; and
  initiating transfer of data stored in the storage means over the common bus to the enabled UTOPIA physical devices; and
a transfer means for transmitting the data stored in the buffer substantially simultaneously to the enabled UTOPIA physical devices.

* * * * *